United States Patent
Yamazaki

[19]

[11] Patent Number: 5,470,125
[45] Date of Patent: Nov. 28, 1995

[54] MOTOR VEHICLE DOOR WITH REINFORCING BEAMS

[75] Inventor: Shouji Yamazaki, Wako, Japan

[73] Assignee: Honda Giken Kogyo Kabushiki Kaisha, Tokyo, Japan

[21] Appl. No.: 205,482

[22] Filed: Mar. 4, 1994

[30] Foreign Application Priority Data

Mar. 5, 1993 [JP] Japan .................. 5-044899

[51] Int. Cl.⁶ ........................................ B60J 5/04
[52] U.S. Cl. .................. 296/146.6; 296/188; 49/503
[58] Field of Search .................. 296/146.6, 146.5, 296/188, 189, 202; 49/502, 503

[56] References Cited

U.S. PATENT DOCUMENTS

| | | | |
|---|---|---|---|
| 3,782,036 | 1/1974 | Clark et al. | 49/502 |
| 3,964,208 | 6/1976 | Renner et al. | 49/502 |
| 4,307,911 | 12/1981 | Paulik | 296/188 |
| 4,702,040 | 10/1987 | Hillriegel | 49/502 |
| 4,860,496 | 8/1989 | Hillriegel | 49/502 |
| 4,969,680 | 11/1990 | Shimoda | 49/502 X |

FOREIGN PATENT DOCUMENTS

| | | | |
|---|---|---|---|
| 274985 | 7/1988 | European Pat. Off. | 296/188 |
| 0577007A2 | 1/1994 | European Pat. Off. | |
| 1480089 | 8/1969 | Germany | 49/502 X |
| 3427537 | 2/1986 | Germany | 296/188 |
| 1116359 | 6/1968 | United Kingdom . | |
| 1392710 | 4/1975 | United Kingdom . | |
| 2101535 | 1/1983 | United Kingdom | 296/202 |
| 2222847 | 3/1990 | United Kingdom . | |
| WO92/12871 | 8/1992 | WIPO . | |

*Primary Examiner*—Dennis H. Pedder
*Attorney, Agent, or Firm*—Armstrong, Westerman, Hattori, McLeland & Naughton

[57] ABSTRACT

A motor vehicle door includes a hollow door body having a pair of vertically spaced hinges mounted on an end thereof. The hinges are mounted on a motor vehicle body for openably closing the door body over a door opening in the motor vehicle body. The motor vehicle door also has a lock mounted on an opposite end of the door body, and a substantially triangular truss fixedly housed in the door body and connected between the hinges and the lock. The substantially triangular truss comprises a vertical beam connected to the hinges and a pair of vertically spaced upper and lower cross beams joined at respective ends thereof to the vertical beam near the hinges, respectively, and joined at respective opposite ends thereof to the lock.

5 Claims, 3 Drawing Sheets

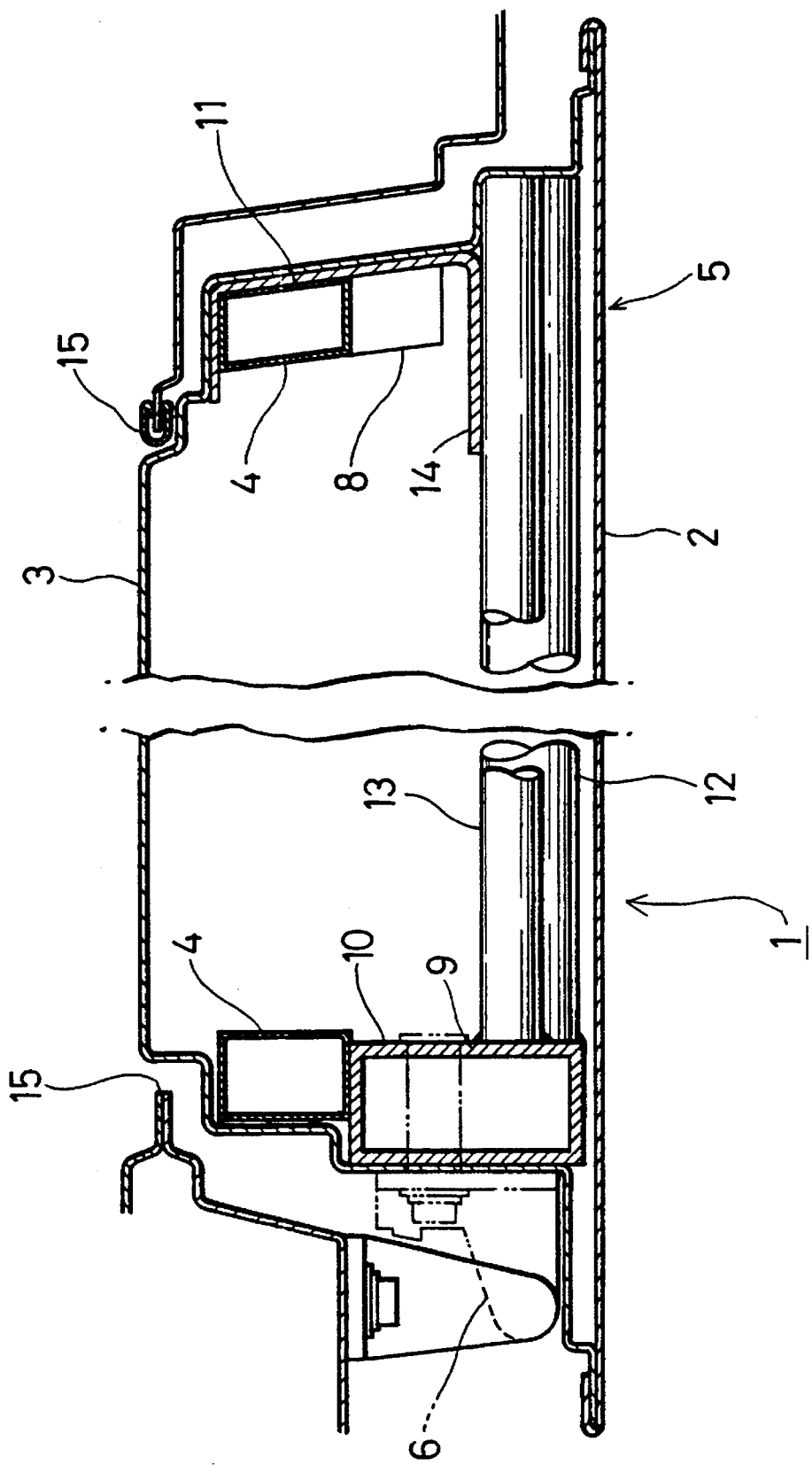

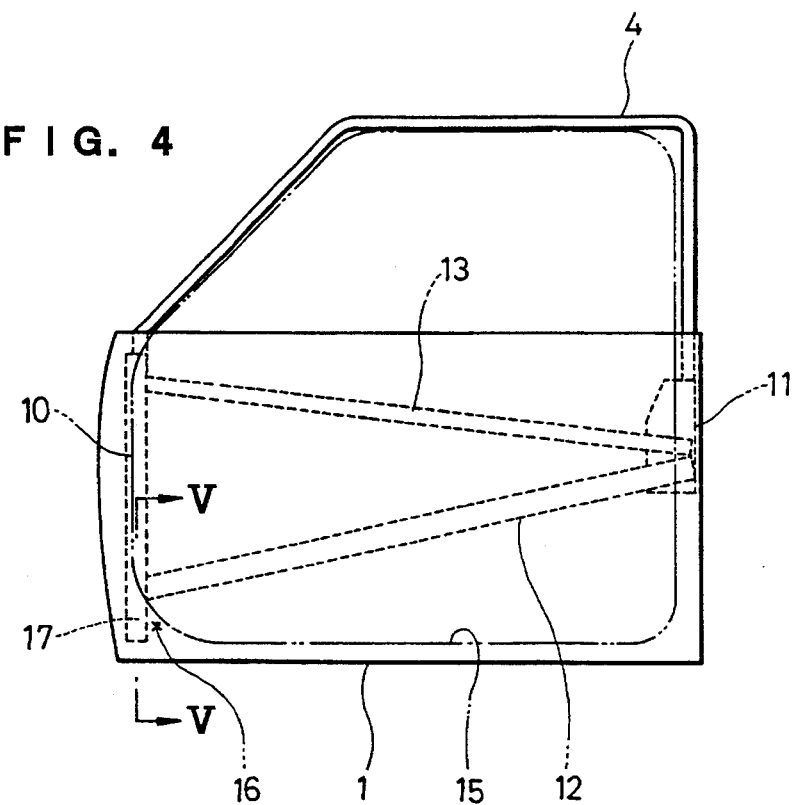
FIG. 4
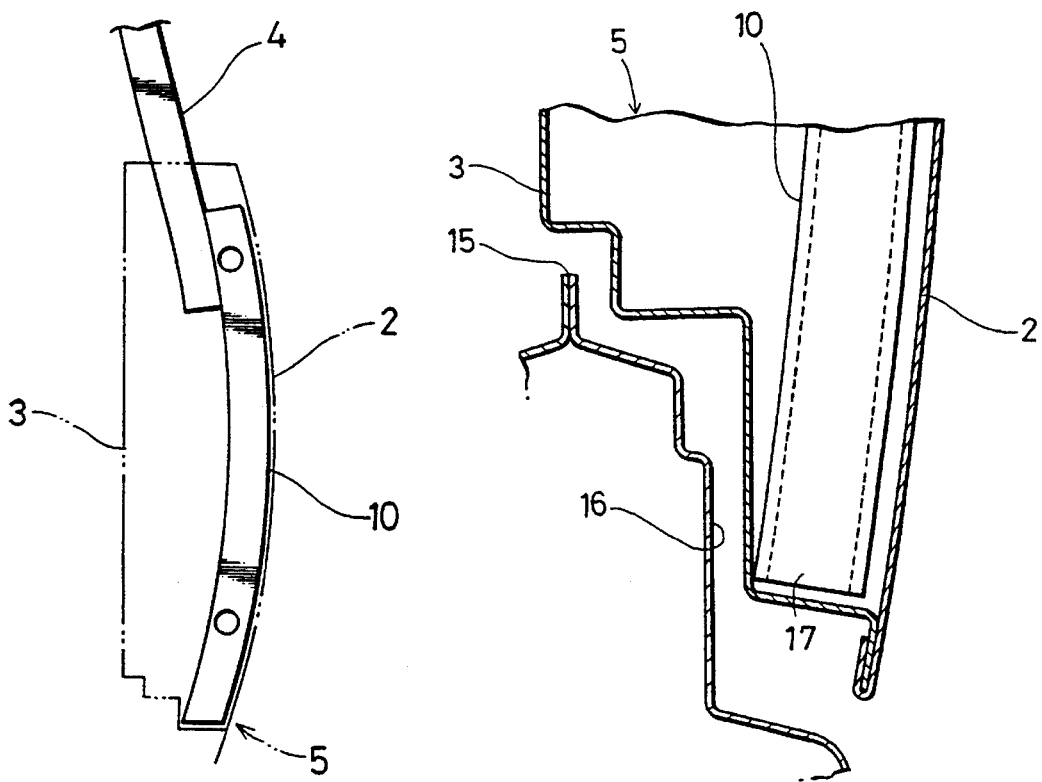
FIG. 3
FIG. 5

MOTOR VEHICLE DOOR WITH REINFORCING BEAMS

BACKGROUND OF THE INVENTION

1. Field of the Invention

The present invention relates to a door for use on a motor vehicle such as an automobile or the like.

2. Description of the Prior Art

Generally, a motor vehicle door is openably and closably mounted on a motor vehicle body by a plurality of vertically spaced hinges mounted on a substantially vertical edge of the door. The motor vehicle door can be locked in a closed position by a lock incorporated in the door.

Motor vehicle doors are required to have a sufficient degree of rigidity to resist forces applied from front and side areas. In recent years, reinforcements known as impact beams are placed in motor vehicle doors to protect them against large external forces that are applied upon motor vehicle collision.

Such impact beams are, however, responsible for an increase in the weight of motor vehicle doors, resulting in an increase in the weight of motor vehicles.

SUMMARY OF THE INVENTION

It is therefore an object of the present invention to provide a motor vehicle door having lightweight reinforcing beams arranged effectively to increase the rigidity of the motor vehicle door, so that the motor vehicle door has a relatively high degree of rigidity and a relatively small weight.

According to the present invention, there is provided a motor vehicle door comprising a door body, hinge means mounted on the door body for openably closing the door body over a door opening in a motor vehicle body, at least one cross beam disposed in the door body and connected to the hinge means, and a vertical beam disposed in the door body and joined to the at least one cross beam, the vertical beam having an end portion which will be positioned in laterally overlapping relationship to a corner of the door opening when the door opening is closed by the door body. The door body may comprise an inner panel and an outer panel joined to the inner panel and curved convexly outwardly, the vertical beam being curved convexly outwardly along the outer panel. The motor vehicle door may further comprise a plurality of cross beams disposed in the door body and a lock mounted on the door body remotely from the hinge means, the hinge means comprising a plurality of vertically spaced hinges joined to the vertical beam, the cross beams extending from the lock toward the hinges, respectively, and having respective ends joined to the vertical beam near the hinges, respectively. The lowermost one of the cross beams may be thicker than the other cross beams. The motor vehicle door may further comprise a bracket securely housed in the door body in surrounding relationship to the lock, the cross beams having respective opposite ends joined to the bracket, and a window frame mounted on the door body, the window frame having a lower end joined to the vertical beam and an opposite lower end joined to the bracket.

According to the present invention, there is also provided a motor vehicle door comprising a door body, a pair of vertically spaced hinges mounted on an end of the door body and adapted to be mounted on a motor vehicle body for openably closing the door body over a door opening in the motor vehicle body, a lock mounted on an opposite end of the door body, and a substantially triangular truss fixedly housed in the door body and connected between the hinges and the lock. The substantially triangular truss may comprise a vertical beam connected to the hinges and a pair of vertically spaced upper and lower cross beams joined at respective ends thereof to the vertical beam near the hinges, respectively, and joined at respective opposite ends thereof to the lock. The vertical beam may have an end portion which will be positioned in laterally overlapping relationship to a corner of the door opening when the door opening is closed by the door body. The door body may comprise an inner panel and an outer panel joined to the inner panel and curved convexly outwardly, the vertical beam being curved convexly outwardly along the outer panel. The lower cross beam may be thicker than the upper cross beam. The motor vehicle door may further include a bracket securely housed in the door body in surrounding relationship to the lock, the opposite ends of the cross beams being joined to the bracket, and a window frame mounted on the door body, the window frame having a lower end joined to the vertical beam and an opposite lower end joined to the bracket.

According to the present invention, there is further provided a motor vehicle door comprising a door body, a plurality of vertically spaced hinges mounted on the door body and adapted to be mounted on a motor vehicle body for openably closing the door body over a door opening which is defined in the motor vehicle body and has a size smaller than the door body, and a vertical beam disposed in the door body and having an end portion which will be positioned in laterally overlapping relationship to a corner of the door opening when the door opening is closed by the door body. External forces applied laterally to the motor vehicle door are transmitted through the vertical beam to the hinges and the corner of the door opening. Therefore, the applied external forces are distributed and borne by the motor vehicle body.

According to the present invention, there is also provided a motor vehicle door comprising a door body including an outer panel curved convexly outwardly, a plurality of vertically spaced hinges mounted on the door body and adapted to be mounted on a motor vehicle body for openably closing the door body over a door opening which is defined in the motor vehicle body and has a size smaller than the door body, and a vertical beam disposed in the door body and curved convexly outwardly along the outer panel of the door body. External forces applied laterally to the motor vehicle door are distributed vertically by the curved vertical beam, so that the motor vehicle door is prevented from being locally deformed.

According to the present invention, there is also provided a motor vehicle door comprising a door body, a plurality of vertically spaced hinges mounted on the door body and adapted to be mounted on a motor vehicle body for openably closing the door body over a door opening which is defined in the motor vehicle body, a lock mounted on the door body for locking the door body locked over the door opening, a vertical beam disposed in the door body and interconnecting the hinges, a first cross beam disposed in the door body and extending from the lock toward a lowermost one of the hinges, the first cross beam being joined to the vertical beam, and a second cross beam disposed in the door body and extending from the lock toward another of the hinges, the second cross beam being joined to the vertical beam, the second cross beam having a cross-sectional area smaller than the first cross beam. The vertical and cross beams jointly make up a substantially triangular truss with the lock positioned on the vertex thereof. The substantially triangular truss disposed in the motor vehicle door is effective to increase the rigidity of the motor vehicle door. The first cross beam, which is thicker and stronger than the second cross beam, can withstand lateral forces applied to the motor vehicle door at a lower position thereon. The second cross beam, which has a cross-sectional area smaller than the first cross beam, has a reduced weight, and hence makes the motor vehicle door lightweight.

According to the present invention, there is also provided a motor vehicle door comprising a door body, a plurality of vertically spaced hinges mounted on the door body and adapted to be mounted on a motor vehicle body for openably closing the door body over a door opening which is defined in the motor vehicle body, a lock mounted on the door body for locking the door body locked over the door opening, a vertical beam disposed in the door body and interconnecting the hinges, a plurality of cross beams disposed in the door body and extending from the lock toward the hinges, respectively, the cross beams being joined to the hinges, respectively, and a window frame mounted on the door body, the window frame having a lower end joined to either the vertical beam or the cross beams. Therefore, the window frame is securely attached to the door body for higher mechanical strength.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 2 is an enlarged cross-sectional view taken along line II—II of FIG. 1;

FIG. 3 is a fragmentary elevational view showing a window frame and a vertical beam in the motor vehicle door;

FIG. 4 is an elevational view of the motor vehicle door as it is closed over a door opening in a motor vehicle body; and FIG. 5 is an enlarged cross-sectional view taken along line V—V of FIG. 4.

DETAILED DESCRIPTION OF THE PREFERRED EMBODIMENT

Figure 1:
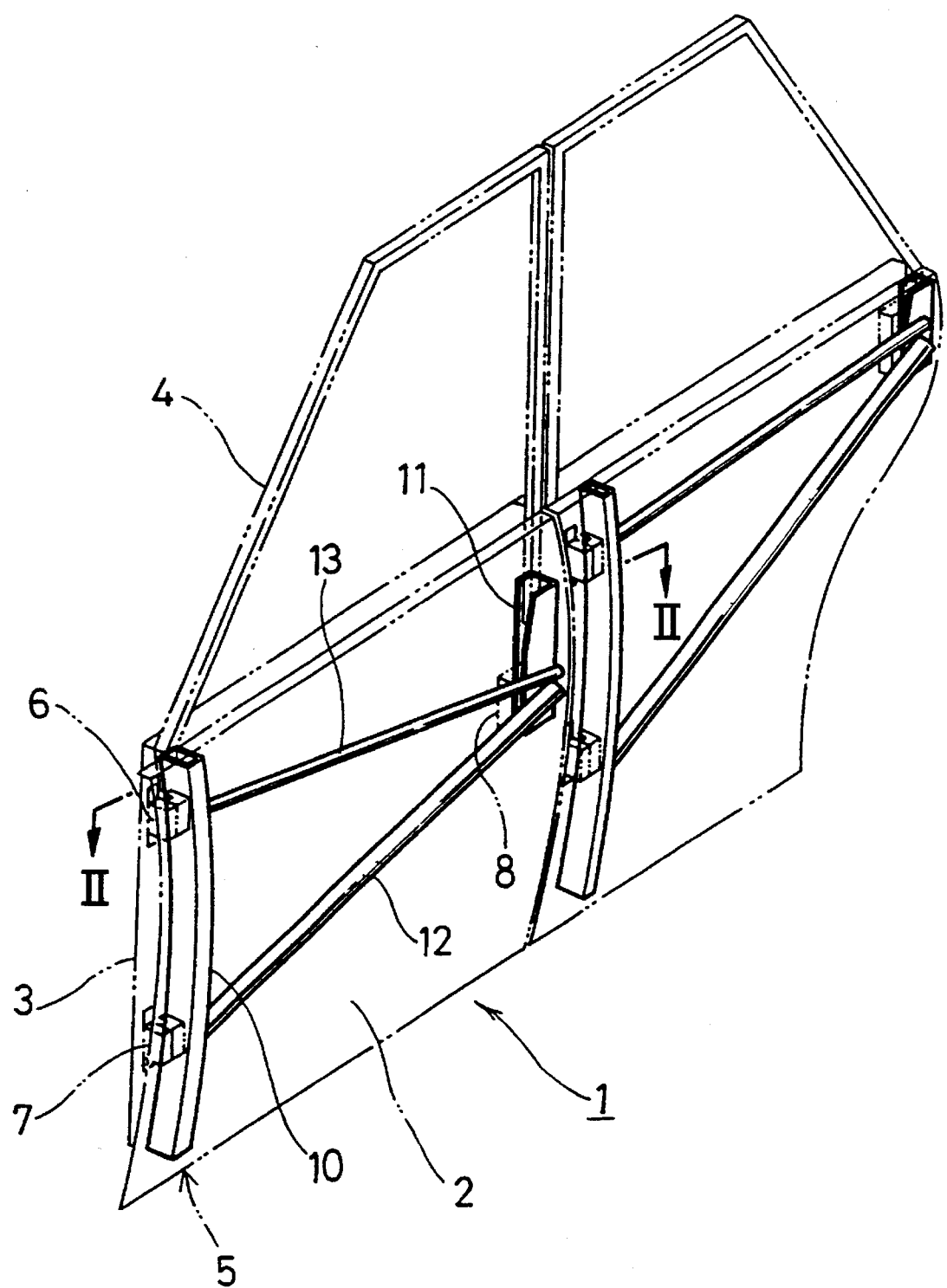
FIG. 1 is a schematic perspective view of a motor vehicle door according to the present invention.

FIG. 1 shows front and rear doors on the motor vehicle body of a motor vehicle such as an automobile. Both the front and rear doors shown in FIG. 1 incorporate the principles of the present invention. Since, however, the front and rear doors are of basically the same structure as each other, only the front door will be described below as a motor vehicle door according to the present invention.

As shown in FIG. 1, the motor vehicle door, generally designated by the reference numeral 1, has a reinforcing structure composed of reinforcing beams housed therein. Specifically, the motor vehicle door 1 comprises an outer panel 2 curved convexly outwardly as indicated by the imaginary lines, and an inner panel 3 extending relatively flatwise, the outer and inner panels 2, 3 being joined to each other into a hollow door body 5 in the form of a vertically elongate box. The motor vehicle door 1 also includes a window frame 4 known as a window sash mounted on the upper end of the hollow door body 5. The hollow door body 5 houses a window regulator for vertically moving a window glass panel into and out of the window frame 4. When the window glass panel is fully elevated into the window frame 4, the window glass panel has its edges sealed against the window frame 4, closing the window opening defined by the window frame 4.

The motor vehicle door 1 has a pair of upper and lower hinges 6, 7 positioned on a front end of the hollow door body 5 and vertically spaced from each other, and a lock 8 positioned on a rear end of the hollow door body 5 for locking the motor vehicle door 1 closed over a door opening 15 (see FIG. 2) defined in the motor vehicle body.

The upper and lower hinges 6, 7 are mounted on a vertical beam 10 that is disposed in the front end of the hollow door body 5. The lock 8 is surrounded by a bracket 11 fixedly housed in the hollow door body 5. The lock 8 and the bracket 11 may be of an integral structure. A lower cross beam 12 obliquely extends from the bracket 11 toward the lower hinge 7, and has front and rear ends coupled respectively to the bracket 11 and the vertical beam 10. Specifically, the lower hinge 7 is fixed to a front vertical surface of the vertical beam 10, and the front end of the lower cross beam 12 is fixed to a rear vertical surface of the vertical beam 10. Therefore, forces can well be transmitted from the lower cross beam 12 to the lower hinge 7 or vice versa through the vertical beam 10.

An upper cross beam 13 obliquely extends from the bracket 11 toward the upper hinge 6 in upwardly spaced relationship to the lower cross beam 12, and has front and rear ends coupled respectively to the bracket 11 and the vertical beam 10. Specifically, the upper hinge 7 is fixed to the front vertical surface of the vertical beam 10, and the front end of the upper cross beam 13 is fixed to the rear vertical surface of the vertical beam 10. The upper cross beam 13 is more slender than the lower cross beam 12, i.e., has a smaller cross-sectional area than the lower cross beam 12.

As shown in FIG. 2, the cross beams 12, 13 are in the form of rods having circular cross section. The upper cross beam 13 has an inner edge substantially aligned with the inner edge of the lower cross beam 12. The vertical beam 10 has a hollow rectangular cross section, whereas the bracket 11 has a deformed channel-shaped cross section. The front ends of the cross beams 12, 13 are coupled perpendicularly to a rear vertical web 9 of the vertical beam 10. The rear ends of the cross beams 12, 13 have respective inner edges coupled parallel to an outer web 14 of the bracket 11. The door opening 15 which can be closed by the motor vehicle door 1 is smaller than the motor vehicle door 1.

The window frame 4 has a front lower end joined to the vertical beam 10 as by welding and a rear lower end joined to the bracket 11 as by welding. More specifically, as shown in FIG. 3, the front lower end of the window frame 4 is joined to an upper end portion of the vertical beam 10. Similarly, the rear lower end of the window frame 4 is joined to an upper end portion of the bracket 11. Therefore, the window frame 4 is anchored highly rigidly to the hollow door body 5 of the motor vehicle door 1.

As shown in FIG. 3, the vertical beam 10 comprises a curved beam which projects convexly outwardly and extends along the outer panel 2.

As shown in FIGS. 4 and 5, the vertical beam 10 has a lower end portion 17 extending downwardly beyond the lower hinge 7. When the door opening 15 is closed by the motor vehicle door 1, the lower end portion 17 is positioned in laterally overlapping relationship to a lower corner 16 of the door opening 15, i.e., is positioned immediately laterally of the lower corner 16.

The motor vehicle door 1 shown in FIGS. 1 through 5 operates as follows:

When large lateral forces are applied to the motor vehicle door 1 in a direction into the sheet of FIG. 4, the applied forces are transmitted through the cross beams 12, 13 to the vertical beam 10 and the bracket 11. The transmitted forces are then applied to the motor vehicle body through the hinges 6, 7 and the lock 8. Furthermore, since the lower end portion 17 of the vertical beam 10 is positioned in overlapping relationship to the lower corner 16 of the door opening 15, the forces applied to the vertical beam 10 can also be transmitted through the lower end portion 17 of the vertical beam 10 and the lower corner 16 to the motor vehicle body. Inasmuch as the lower corner 16 is usually of higher rigidity than the other edges of the door opening 15, the lower corner 16 has a greater ability to bear intensive external forces applied from the motor vehicle door 1.

Because the vertical beam 10 is curved convexly outwardly as shown in FIG. 3, external forces applied thereto are quickly distributed vertically therealong, and also partly distributed through the cross beam 12, 13. Therefore, the motor vehicle door 1 has an improved ability to resist external forces applied laterally thereto.

The cross beams 12, 13 have different cross-sectional areas for the following reasons: Lateral external forces are typically applied to the motor vehicle door 1 when the motor vehicle door 1 is laterally hit by another motor vehicle such as an automobile. Since such another motor vehicle usually has a bumper in a low position, the lower cross beam 12 is often hit by the bumper of the other motor vehicle. Therefore, the lower cross beam 12 has a larger cross-sectional area or is thicker than the upper cross beam 13 for a greater rigidity against deformation. In FIG. 14, part of the forces applied to the lower cross beam 12 is transmitted through the vertical beam 10 to the lower corner 16 of the door opening 15, which efficiently bears the transmitted forces. The upper cross beam 13 of smaller cross-sectional area has a smaller weight than the lower cross beam 12.

The motor vehicle door 1 is also advantageous in the context of its normal usage, as described below.

Since the motor vehicle door 1 is cantilevered by the hinges 6, 7 as shown in FIG. 1, the rear end of the motor vehicle door 1 where the lock 8 is installed tends to flex vertically. It is important that the cantilevered motor vehicle door 1 suffer less vertical flexure at its rear end so that the lock 8 will not be lowered from its normal position. According to the reinforcing structure of the motor vehicle door 1, the vertical beam 10 and the cross beams 12, 13 are arranged as a substantially triangular truss with the lock 8 positioned on its vertex. In the substantially triangular truss, the lower thicker cross beam 12 serves to bear compressive forces and the upper thinner cross beam 13 serves to bear tensile forces. Such a reinforcing truss incorporated in the motor vehicle door 1 is effective to make the motor vehicle door 1 resistant to vertical flexure.

While the motor vehicle front door has been described as the motor vehicle door 1 according to the present invention, the principles of the present invention are applicable to a motor vehicle rear door, and also to any of various motor vehicle doors other than automobile doors.

The motor vehicle door according to the present invention may have three or more cross beams with the lowermost cross beam thicker than the other cross beams.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A motor vehicle door, comprising:

a door body;

hinge means mounted on said door body for openably closing the door body over a door opening in a motor vehicle body;

a plurality of cross beams disposed in said door body and connected to said hinge means;

a vertical beam disposed in said door body between a front end of each said cross beam and a front end of said door body and having a rear vertical surface joined to each said cross beam at said front ends of each said cross beam, said vertical beam having a lower end portion positionable in laterally overlapping relationship to a corner of the door opening when the door opening is closed by said door body;

said door body including an inner panel and an outer panel joined to said inner panel and curved convexly outwardly, said vertical beam being curved convexly outwardly along said outer panel; and a lowermost one of said cross beams being the thickest of said plurality of cross beams.

2. A motor vehicle door according to claim 1, said plurality of cross beams comprising two said cross beams disposed in said door body and a lock mounted on said door body remotely from said hinge means, said hinge means comprising two vertically spaced hinges joined to said vertical beam, said cross beams extending from said lock toward said hinges, respectively, and having respective ends joined to said vertical beam near said hinges, respectively.

3. A motor vehicle door according to claim 2, further comprising a bracket securely housed in said door body and surrounding around a portion of said lock, said cross beams having respective opposite ends joined to said bracket.

4. A motor vehicle door according to claim 3, further comprising a window frame mounted on said door body, said window frame having a lower end joined to said vertical beam and an opposite lower end joined to said bracket.

5. A motor vehicle door according to claim 2, wherein said two cross beams and said vertical beam form a substantially triangular truss.

\* \* \* \* \*